United States Patent

Kouwa et al.

Patent Number: 5,900,721
Date of Patent: May 4, 1999

[54] CONTROL DEVICE FOR A VEHICLE A.C. GENERATOR

[75] Inventors: Tatsuki Kouwa; Keiichi Komurasaki; Hirofumi Watanabe, all of Tokyo, Japan

[73] Assignee: Mitsubishi Denki Kabushiki Kaisha, Tokyo, Japan

[21] Appl. No.: 08/843,064

[22] Filed: Apr. 11, 1997

[30] Foreign Application Priority Data

Oct. 29, 1996 [JP] Japan .................................. 8-286676

[51] Int. Cl.$^6$ .................................................. H02P 9/00
[52] U.S. Cl. ...................................... 322/27; 361/600
[58] Field of Search .............................. 322/21, 27, 37, 322/58, 99, 100; 361/600; 174/253

[56] References Cited

U.S. PATENT DOCUMENTS

| | | | |
|---|---|---|---|
| 4,598,333 | 7/1986 | Adams et al. | 361/286 |
| 4,641,043 | 2/1987 | Adams et al. | 307/117 |
| 5,270,493 | 12/1993 | Inoue et al. | 174/253 |
| 5,574,395 | 11/1996 | Kusakabe | 327/309 |
| 5,705,922 | 1/1998 | VanDyke | 323/352 |
| 5,719,487 | 2/1998 | Sato et al. | 322/28 |

FOREIGN PATENT DOCUMENTS

| | | |
|---|---|---|
| 016 228 | 10/1980 | European Pat. Off. . |
| 389 976 | 10/1990 | European Pat. Off. . |
| 54-140224 U | 9/1979 | Japan . |

*Primary Examiner*—Nestor Ramirez
*Assistant Examiner*—Nicholas Ponomarenko
*Attorney, Agent, or Firm*—Sughrue, Mion, Zinn, Macpeak & Seas, PLLC

[57] ABSTRACT

A control device for a vehicle A.C. generator which is used to supply a vehicle load such as a battery. The control device includes a semiconductor switching element for controlling a field current in a field winding of the generator. The control device also includes a ground pattern conductor arranged between a power source terminal connecting the semiconductor switching element and the load and a control signal input terminal for inputting a control signal to the semiconductor switching element. The ground pattern conductor is further connected to a ground terminal of the semiconductor switching element. This arrangement affords protection from short circuiting of the power source terminal and the control terminal.

1 Claim, 3 Drawing Sheets

VARIOUS CONTROL SIGNALS

CONTROL DEVICE FOR A VEHICLE A.C. GENERATOR

BACKGROUND OF THE INVENTION

1. Field of the Invention

The present invention relates to a control device for a vehicle a.c. generator, in particular to the arrangement of a field current control circuit for controlling a field current in an a.c. generator.

2. Discussion of Background

As a control device for a vehicle a.c. generator, there has been known the one shown in FIG. 4. In this Figure, reference numeral 1 designates an a.c. generator which includes armature coils 101 and a field winding 102. Reference numeral 2 designates a rectifier which includes an output terminal 201 and a ground (earth) terminal 202. Reference numeral 3 designates a field current control circuit which is constituted by a semiconductor switching element 301 and a suppression diode 302, and which includes four terminals of a power source terminal "a", a field current control terminal "b", a control signal input terminal "c" and a ground (earth) terminal "d". Reference numeral 4 designates a control unit which is mounted on a vehicle and includes a microcomputer. Reference numeral 5 designates a battery, and reference numeral 6 designates a key switch.

Now, the operation of the control device will be explained. When a control signal is sent out from the control unit 4 to the control signal input terminal "c" of the field current control circuit 3, the semiconductor switching element 301 is driven to conduction to flow a field current in the field winding 102, generating electricity at the a.c. generator 1 The output from the a.c. generator is rectified by the rectifier 2, and charges the battery 5. On the other hand, the control unit 4 detects the terminal voltage of the battery 5. When the control unit detects that the terminal voltage of the battery becomes higher than a predetermined voltage, the control unit cuts off the control signal to the field current control circuit 3 to decrease the field current so as to lower the output from the a.c. generator, stopping charging the battery. Such a operation is repeated to control the output voltage of the a.c. generator.

The field current control circuit 3 for that type of control device is arranged separately from the output portion of the a.c. generator 1 (the rectifier 2 in the shown example) to optimize temperature characteristics as disclosed in JP-U-54-140224. The field current control circuit is arranged as shown in FIG. 5. Specifically, the semiconductor switching element (e.g. transistors) 301 has the collector connected to the field current control terminal "b", the base connected to the control signal input terminal "c", and the emitter connected to the ground terminal "d", respectively. The suppression diode 302 is connected between the power source terminal "a" and the field current control terminal "b".

Since the control device stated above is constructed with the field current control circuit 3 having the power source terminal "a" adjoining the control signal input terminal "c", the control device has created problems in that the power source terminal "a" and the control signal input terminal "c" are readily short-circuited by entrance of water, for example, and that in such case a short-circuit current flows from the battery 5 directly into the control signal input terminal "c", the semiconductor switching element 301 is driven to conduction to increase the field current, and the output voltage from the a.c. generator is extraordinarily raised to overcharge the battery 5 or damage an electrical load such as a headlight due to overvoltage, and further to damage an electrical system for ignition or the control unit, thereby stopping the engine.

SUMMARY OF THE INVENTION

It is an object of the present invention to solve these problems, and to provide a control device for a vehicle a.c. generator capable of protecting a control signal input terminal against a short-circuit current in case of entrance of water, for example, and preventing a battery from being overcharged due to an extraordinary raise in an output voltage from the a.c. generator and an electrical system from being damaged or broken due to overvoltage.

The present invention provides a control device for a vehicle a.c. generator which comprises an a.c. generator; a semiconductor switching element for controlling a field current to flow in a field winding of the generator; a control unit for outputting a control signal for turning the semiconductor switching element on and off; and a battery charged by output from the generator and supplying power to the semiconductor switching element and the control unity wherein a ground (earth) pattern is arranged or disposed on the control device between a power source terminal connecting the semiconductor switching element and the battery, and a control signal input terminal for inputting the control signal into the semiconductor switching elements and the ground pattern is connected to a ground (earth) terminal of the semiconductor switching element.

In addition, the ground pattern may be arranged or disposed on the control device so as to surround the control signal input terminal.

The ground pattern may also have the control signal input terminal and an insulating layer for insulating the control signal terminal therefrom layered thereon.

As described, the control device according to the present invention can have the ground pattern arranged between the power source terminal and the control signal input terminal to protect the control signal input terminal against a short-circuit current. Such arrangement can prevent the battery from being overcharged or an electrical system from being damaged or broken due to overvoltage which can be caused by an extraordinary raise in the output voltage of the a.c. generator as a result of an increase in the field current due to conduction of the semiconductor switching element by the short-circuit current.

The provision of the ground pattern disposed around the control signal input terminal can protect the control signal input terminal against the short-circuit current in a reliable manner.

The provision of the insulating layer and the control signal input terminal on the ground pattern in such a layered structure can restrain the power source terminal and the control signal input terminal from being short-circuited as well as protect the control signal input terminal against the short-circuit current.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

EMBODIMENT 1

Figure 1:
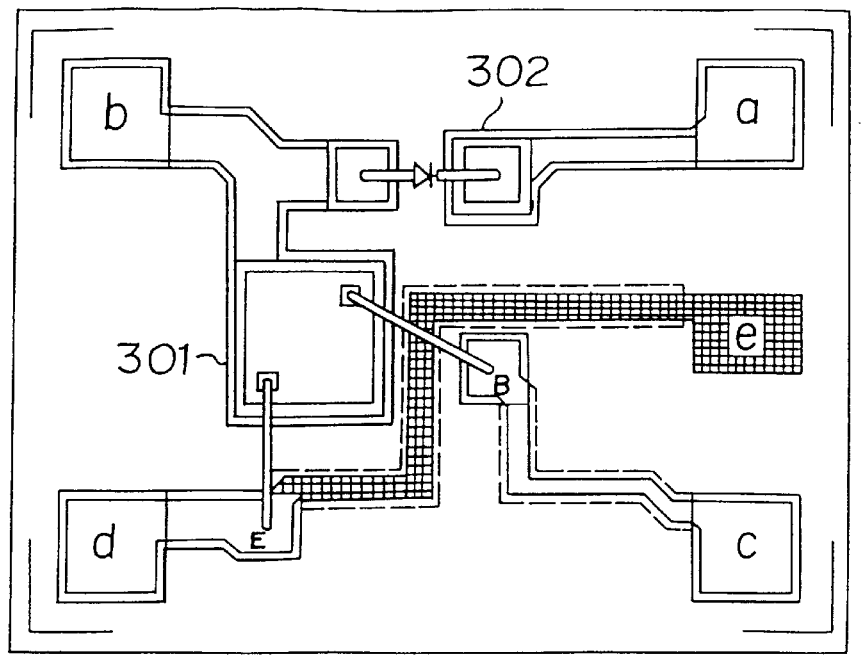
FIG. 1 is a schematic diagram of the field current switching circuit in the control device for a vehicle a.c. generator according to a first embodiment of the present invention.

A first embodiment according to the present invention will be explained. Although the first embodiment has a basic structure similar to the conventional control device shown in FIGS. 4 and 5, the first embodiment has a field current control circuit 3 constructed as shown in FIG. 1. Specifically, a ground (earth) circuit pattern "e" which is connected to a ground (earth) terminal "d" is disposed on the field current control circuit 3 to extend between a power source terminal "a" and a control signal input terminal "c".

Figure 4:
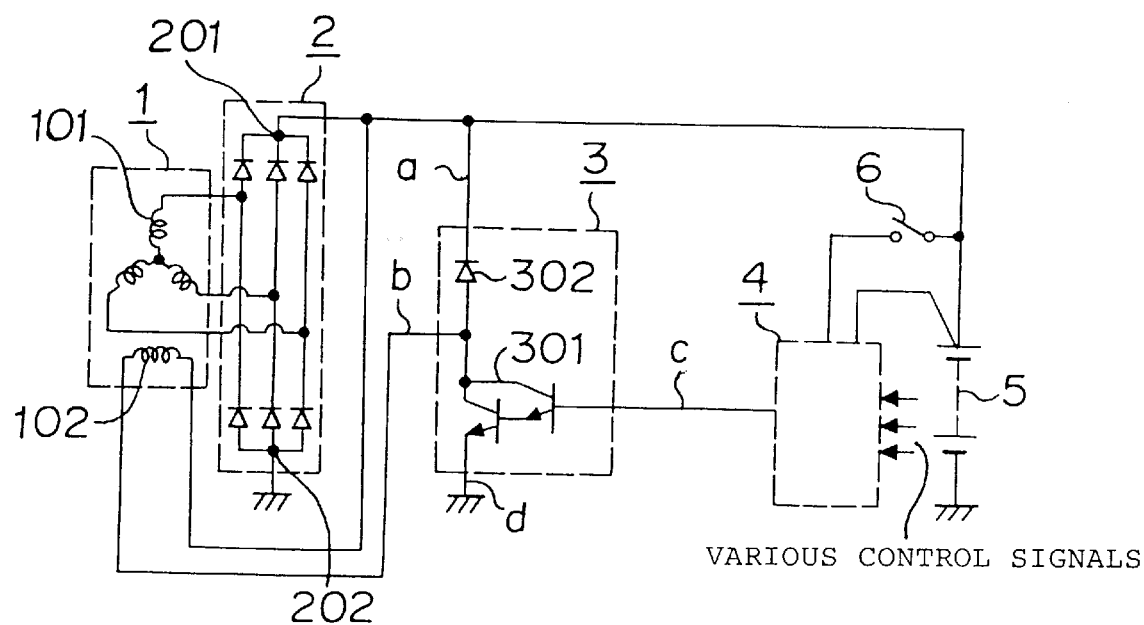
FIG. 4 is a schematic diagram showing the structure of a conventional control device for a vehicle a.c. generator.
Figure 5:
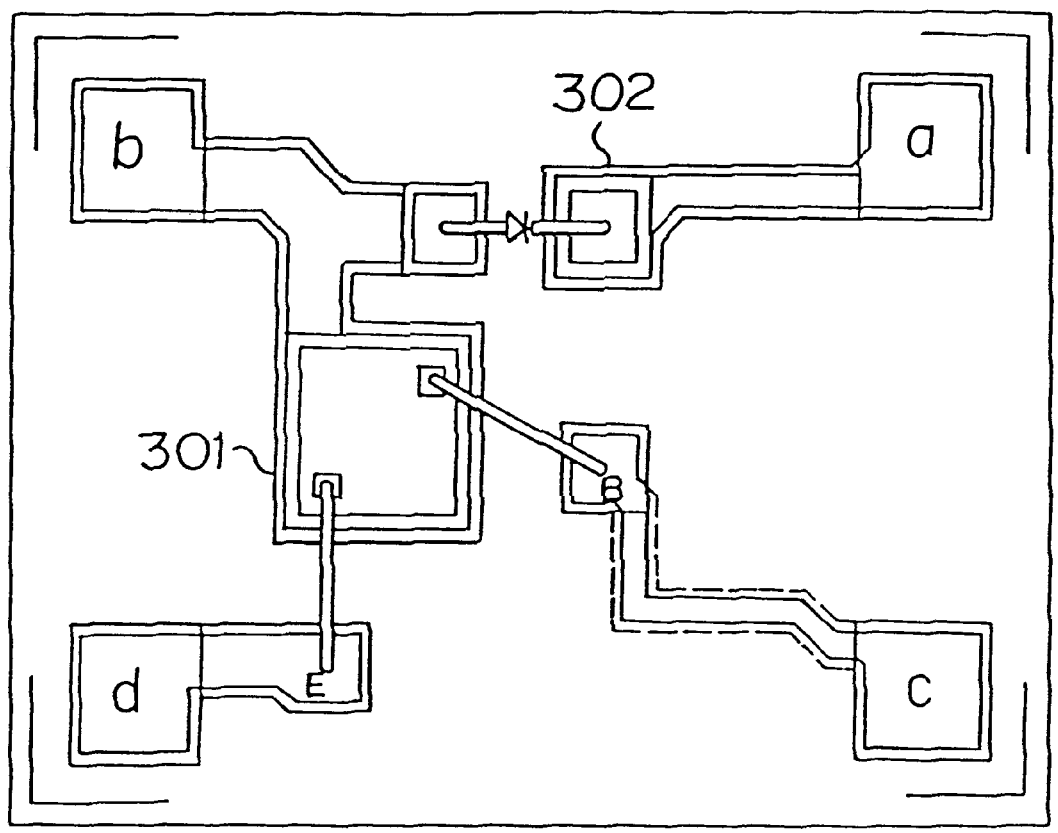
FIG. 5 is a schematic diagram of the field current switching circuit in the conventional control devices

The control device for a vehicle a.c. generators which is provided with such a field current control circuit 3, works like the conventional control device shown in FIGS. 4 and 5 in a normal state. On the other hand, in case of entrance of water, for example, even if for example the power source terminal "a" and the control signal input terminal "c" short-circuit, the short-circuit current flows from the power source terminal "a" into the ground pattern a "e" because of presence of the ground pattern "e" to protect the control signal input terminal "c" against the short-circuit current because the ground pattern "e" is disposed on the field current control circuit 3 to extend between the power source terminal "a" and the control signal input terminal "c". This arrangement can prevent a semiconductor switching element 301 from unnecessarily continuing conduction, and avoid damage to an electrical system due to overvoltage or overcharge of a battery, which is caused by an extraordinary increase in an output voltage from the a.c. generator because of an increased field current.

EMBODIMENT 2

Figure 2:
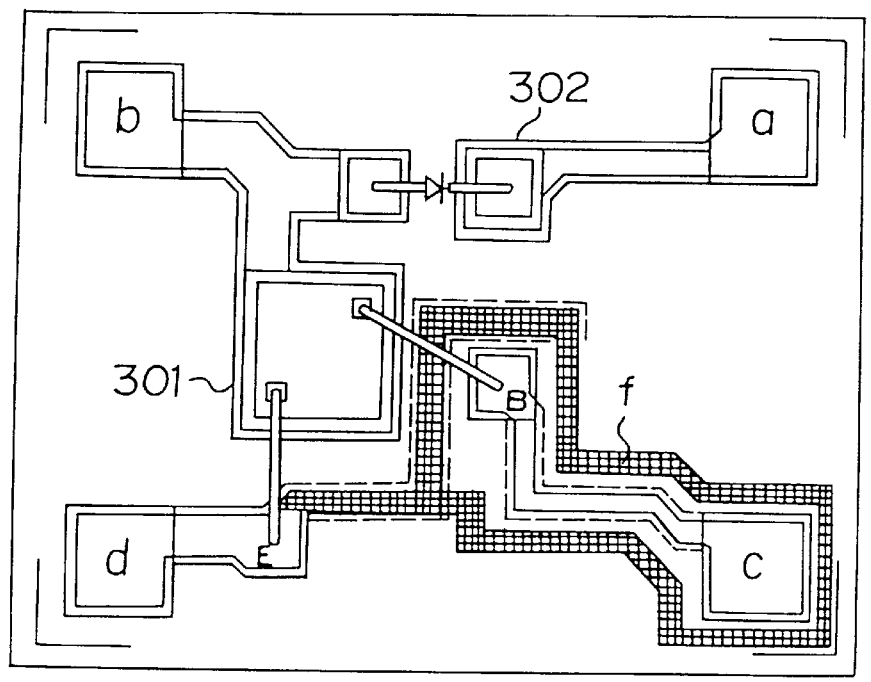
FIG. 2 is a schematic diagram of the field current switching circuit in the control device for a vehicle a.c. generator according to a second embodiment of the present invention.

A second embodiment according to the present invention will be explained. In the second embodiments the field current control circuit 3 is constructed so that a ground pattern "f" is disposed on the field current control circuit 3 so as to surround the control signal input terminal "c" as shown in FIG. 2. In case of entrance of water, for example, a short-circuit can be formed through the ground pattern "f" in either directions allowing the short-circuit current to flow into the ground pattern "f" a so as to reliably protect the control signal input terminal "c" against the short-circuit current because the ground pattern "f" is disposed around the control signal input terminal "c". This arrangement can prevent the semiconductor switching element 301 from unnecessarily conducting, and avoid damage to the electrical system due to overvoltage or overcharge of the battery, which is caused by an extraordinary increase in an output voltage from the a.c. generator.

EMBODIMENT 3

Figure 3:
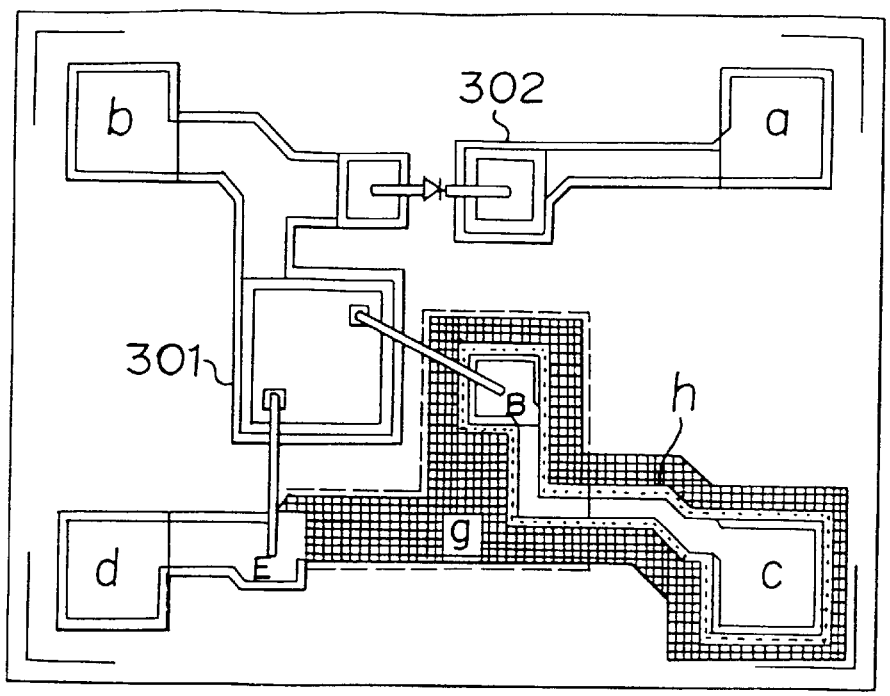
FIG. 3 is a schematic diagram of the field current switching circuit in the control device for a vehicle a.c. generator according to a third embodiment of the present invention.

A third embodiment according to the present invention. In the third embodiment, the field current control circuit 3 is constructed so that a ground pattern "g" has the control signal input terminal "c" disposed thereon with an insulating layer "h" which insulater the control signal input terminal "c" from the ground pattern "g" layered therebetween as shown in FIG. 3. As a result, the ground pattern "g" provides a structure to surround the control signal input terminal "c", offering advantages similar to the second embodiment. In addition, since the control signal input terminal "c" is disposed on the the insulating layer "h", and further on the ground pattern "g" the thickness of that portion of the field current control circuit 3 containing the control signal input terminal "c" is greater than the thickness of that portion of the field current control circuit 3 containing the power source terminal "a", which means that a difference in height is created between the control signal input terminal and the power source terminal, offering an advantage in that a short-circuit between the power source terminal "a" and the control signal input terminal "c" can be restrained.

In the first, second and third embodiments, the control signal input terminal "c" is protected against a short-circuit. In a device which carries out required control by cutting off a current in the control signal input terminal "c", a pattern with "+" potential (e.g. a pattern connected to the power source terminal) is disposed between the control signal input terminal "c" at the ground terminal "d" for protection against line-to-ground faults offering similar advantages.

Obviously, numerous modifications and variations of the present invention are possible in light of the above teachings. It is therefore to be understood that within the scope of the appended claims, the invention may be practiced otherwise than as specifically described herein.

What is claimed is:

1. A control device for a vehicle a.c. generator comprising:

an a.c. generator;

a semiconductor switching element for controlling a field current to flow in a field winding of the generator;

a control unit for outputting a control signal for turning the semiconductor switching element on and off; and a battery charged by output from the generator and supplying power to the semiconductor switching element and the control unit;

wherein a around pattern is disposed between a power source terminal connecting the semiconductor switching element and the battery and a control signal input terminal for inputting the control signal into the semiconductor switching element, and the ground pattern is connected to a ground terminal of the semiconductor switching element;

wherein the around pattern is disposed so as to surround the control signal input terminal, and wherein the control signal input terminal is disposed on an insulating layer for insulating the control signal terminal, the insulating layer, in turn, being disposed on the ground pattern.

* * * * *